US011034465B1

(12) United States Patent
Brady et al.

(10) Patent No.: US 11,034,465 B1
(45) Date of Patent: Jun. 15, 2021

(54) AIRCRAFT MAINTENANCE KIT COMPRISING ZONED MAINTENANCE SCHEMATIC

(71) Applicant: Cutting Dynamics, Inc., Avon, OH (US)

(72) Inventors: Joseph Brady, Westlake, OH (US); William Ryall, Ansonia, CT (US)

(73) Assignee: Cutting Dynamics, Inc., Avon, OH (US)

( * ) Notice: Subject to any disclaimer, the term of this patent is extended or adjusted under 35 U.S.C. 154(b) by 244 days.

(21) Appl. No.: 15/920,931

(22) Filed: Mar. 14, 2018

Related U.S. Application Data

(60) Provisional application No. 62/471,630, filed on Mar. 15, 2017.

(51) Int. Cl.
  *B64F 5/40* (2017.01)
(52) U.S. Cl.
  CPC ..................................... *B64F 5/40* (2017.01)
(58) Field of Classification Search
  CPC ........................................................ B64F 4/50
  See application file for complete search history.

(56) References Cited

PUBLICATIONS

Boeing.Com Article; Copyright 2003, Boeing, All Pages along with figures 2 and 3.*

* cited by examiner

*Primary Examiner* — Philip J Bonzell
*Assistant Examiner* — Tye William Abell
(74) *Attorney, Agent, or Firm* — Edwin A. Sisson, Attorney at Law, LLC; Jeffrey J. Banyas

(57) ABSTRACT

This specification discloses an aircraft maintenance kit. The aircraft maintenance kit comprises a plurality of packages with each package of the plurality of packages comprising a unique aircraft maintenance zone designation and at least one maintenance zone component. Each unique aircraft maintenance zone designation preferably corresponds to a unique maintenance zone of the aircraft. Preferably, the aircraft maintenance kit also comprises an aircraft schematic comprising a plurality of aircraft schematic zones. Each aircraft schematic zone preferably comprises a unique aircraft schematic zone designation corresponding to one of the unique aircraft maintenance zone designations.

19 Claims, 1 Drawing Sheet

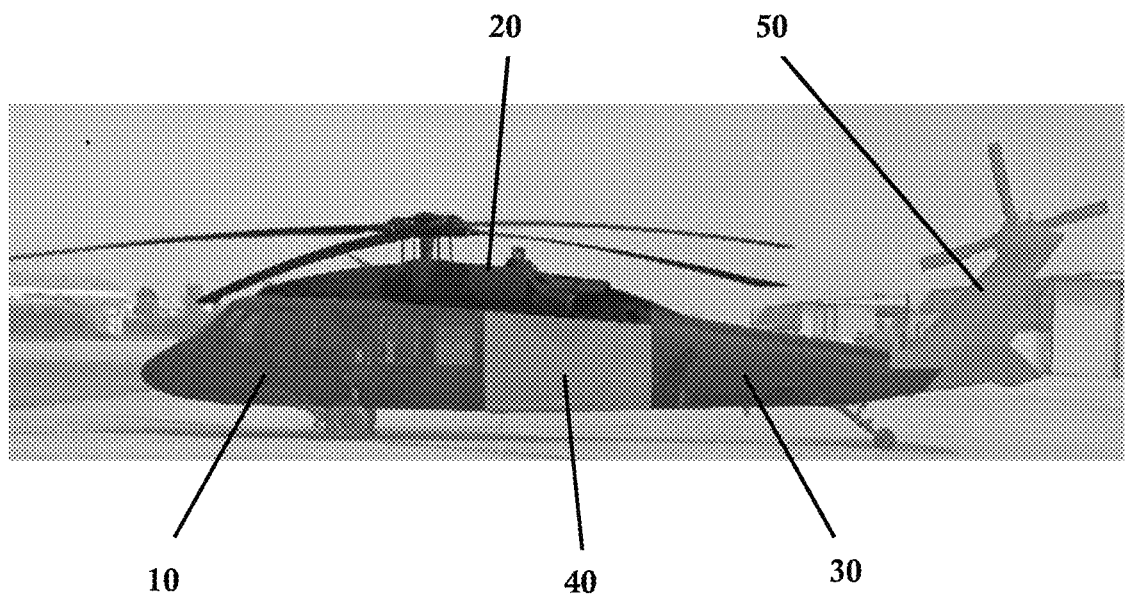

AIRCRAFT MAINTENANCE KIT COMPRISING ZONED MAINTENANCE SCHEMATIC

CROSS REFERENCES AND PRIORITIES

This Application claims priority from U.S. Provisional Application No. 62/471,630 filed on 15 Mar. 2017, the teachings of which are incorporated by reference herein in their entirety.

BACKGROUND

Many aircrafts, including airplanes, helicopters, gliders and drones, require annual maintenance at regular intervals to keep the aircraft in good running order. For instance, Sikorsky helicopters require regular maintenance after every three-hundred sixty (360) and seven-hundred and twenty (720) hours of flight time. Other aircraft may require regular maintenance at different intervals The aircraft annual maintenance schedule may be recommended by the aircraft manufacturer or it may be required by a state or federal aviation licensing body or a specific airline. In some instances, maintenance may be required before the annual maintenance deadline due to breakdown(s) and/or part failure(s).

During aircraft maintenance, a maintenance technician may replace any number of aircraft components. Depending on the size and type of the aircraft, the number of components replaced during maintenance can be in the hundreds or even thousands.

Currently, the replacement components are provided to the aircraft maintenance technicians in one large package or kit containing all of the required replacement components for the aircraft. This results in a situation where the maintenance technicians have to engage in a lengthy process of searching for individual replacement components for specific areas of the aircraft. Often the aircraft maintenance technicians have replacement components left over at the conclusion of the maintenance procedure. It can be difficult if not impossible for the aircraft maintenance technician to determine if the left-over replacement components are the result of extra parts being included in the replacement component package, or if a specific component(s) which needed replacing was not replaced.

The need exists, therefore, for an improved aircraft maintenance kit which allows aircraft maintenance technicians to more easily determine which replacement components correspond with each area of the aircraft and eliminate the problem of left over components.

SUMMARY

Disclosed herein is a maintenance kit for an aircraft comprising at least a first package comprising a first unique aircraft maintenance zone designation and a plurality of first maintenance zone components, and at least a second package comprising a second unique aircraft maintenance zone designation and a plurality of second maintenance zone components; wherein the first unique aircraft maintenance zone designation corresponds to a first unique maintenance zone of the aircraft and the second unique aircraft maintenance zone designation corresponds to a second unique maintenance zone of the aircraft.

Each component of the plurality of first maintenance zone components may comprise the first unique aircraft maintenance zone designation and each component of the plurality of second maintenance zone components may comprise the second unique aircraft maintenance zone designation.

Each component of the plurality of first maintenance zone components may be contained in a separate first component package which may comprise the first unique aircraft maintenance zone designation and each component of the plurality of second maintenance zone components may be contained in a separate second component package which may comprise the second unique aircraft maintenance zone designation.

The maintenance kit may further comprise a plurality of additional packages and a plurality of additional unique maintenance zones of the aircraft wherein each of the plurality of additional packages may comprise an additional unique aircraft maintenance zone designation and a plurality of additional maintenance zone components, wherein each additional unique aircraft maintenance zone designation may correspond to one of the additional unique maintenance zones of the aircraft. The plurality of additional packages may comprise up to two additional packages or up to four additional packages.

Each component of the plurality of additional maintenance zone components of each of the plurality of additional packages may comprise the additional unique aircraft maintenance zone designation corresponding to one of the additional unique maintenance zones of the aircraft.

Each component of the plurality of additional maintenance zone components of each of the plurality of additional packages may be contained in a separate additional component package which may comprise the additional unique aircraft maintenance zone designation corresponding to one of the additional unique maintenance zones of the aircraft.

At least one of the aircraft maintenance zone designations may be a separate aircraft maintenance zone designation color, a separate aircraft maintenance zone designation letter, a separate aircraft maintenance zone designation number, a separate aircraft maintenance zone designation symbol, or a separate aircraft maintenance zone designation word or series of separate aircraft maintenance zone designation words.

The aircraft maintenance kit may further comprise an aircraft schematic comprising at least a first aircraft schematic zone comprising a first unique aircraft schematic zone designation, and at least a second aircraft schematic zone comprising a second unique aircraft schematic zone designation; wherein the first unique aircraft schematic zone designation may correspond to the first unique aircraft maintenance zone designation, and the second unique aircraft schematic zone designation may correspond to the second unique aircraft maintenance zone designation.

The aircraft schematic may further comprise a plurality of additional aircraft schematic zones, each of the plurality of additional aircraft schematic zones may comprise an additional unique aircraft schematic zone designation, wherein each additional aircraft schematic zone designation may correspond to one of the additional unique aircraft maintenance zone designations.

Each of the aircraft schematic zone designations may be a separate aircraft schematic zone color corresponding to one of the separate aircraft maintenance zone designation colors, a separate aircraft schematic zone letter corresponding to one of the separate aircraft maintenance zone designation letters, a separate aircraft schematic zone number corresponding to one of the separate aircraft maintenance zone designation numbers, a separate aircraft schematic zone symbol corresponding to one of the separate aircraft maintenance zone designation symbols, or a separate aircraft schematic zone word or series of separate aircraft schematic zone words corresponding to one of the separate aircraft maintenance zone designation words or series of aircraft maintenance zone designation words.

BRIEF DESCRIPTION OF FIGURES

FIG. 1 is one embodiment of an aircraft schematic according to the invention disclosed herein.

DETAILED DESCRIPTION

This specification discloses a maintenance kit for an aircraft comprising a plurality of packages with each package comprising a unique aircraft maintenance zone designation and at least one aircraft maintenance zone component. Each unique aircraft maintenance zone designation corresponds to a unique maintenance zone of the aircraft.

In this specification and in the claims, the phrase unique maintenance zone of the aircraft means a specific region, operations system or zone of the aircraft upon which the maintenance is to be performed. For instance, a helicopter may have five unique maintenance zones. The first unique helicopter maintenance zone may be the helicopter's cabin. The second unique helicopter maintenance zone may be the helicopter's main rotor pylon. The third unique helicopter maintenance zone may be the helicopter's tail cone. The fourth unique helicopter maintenance zone may correspond to a transition section between the helicopter's cabin and the helicopter's tail cone. The fifth unique helicopter maintenance zone may correspond to the helicopter's tail rotor pylon.

The modifier unique means that the maintenance zone exists for only one section of the aircraft, that the aircraft does not have another maintenance zone with the same name.

The different unique maintenance zones of the aircraft will vary depending upon the type of aircraft. For example, an airplane may have a unique maintenance zone for the wings or for the landing gear.

While the examples in this specification focus on the unique maintenance zones of a helicopter, the kit disclosed herein is not limited to use in helicopters. The disclosed kit can be utilized for any type of aircraft including, but not limited to, airplanes, jetliners, helicopters, gliders and drones.

In this specification and in the claims, the phrase unique aircraft maintenance zone designation means the markings or symbols used to identify those parts of the kit that are to be used for the maintenance of the unique aircraft maintenance zone corresponding to the unique maintenance zone designation. Each unique aircraft maintenance zone designation may take many forms. In some embodiments, each of the aircraft maintenance zone designations may be a separate aircraft maintenance zone designation color (e.g. blue, green, purple, red, yellow, orange, white, black, grey and variations and combinations thereof. In some other embodiments, each of the aircraft maintenance zone designations may be a separate aircraft maintenance zone designation letter (e.g. A, B, C, D, E, and so on). In a still other embodiments, each of the aircraft maintenance zone designations may be a separate aircraft maintenance zone designation number (e.g. 1, 2, 3, 4, 5, and so on). In other embodiments, each of the aircraft maintenance zone designations may be a separate aircraft maintenance zone designation symbol. As used in this specification and in the claims, an "aircraft maintenance zone designation symbol" is meant to refer to any marking other than colors, letters, numbers, words or combinations of words. By way of example, but not limitation, an "aircraft maintenance zone designation symbol" may be in the form of Greek letters or Roman numerals. In some embodiments, each of the aircraft maintenance zone designations may be a separate aircraft maintenance zone designation word or series of separate aircraft maintenance zone designation words.

The different types of aircraft maintenance zone designations are not mutually exclusive and can be combined. By way of example, but not limitation, each of the aircraft maintenance zone designations may comprise a separate aircraft maintenance zone designation color and a separate aircraft maintenance zone designation letter. In a separate, non-limiting, example, each of the aircraft maintenance zone designations may comprise a separate aircraft maintenance zone designation symbol and a separate aircraft maintenance zone designation word.

In this specification and in the claims, the phrase one aircraft maintenance zone component, or a plurality of aircraft maintenance zone components, means those aircraft components needed to maintain the equipment in a unique aircraft maintenance zone. For example, these components could include, and are not limited to a seal, a washer, a bolt, a nut, an o-ring, a clip, a shim, a bushing, a retainer, a bearing, a scraper, a screw, a pin—e.g. a cotter pin, a roller, a grommet, a filter, a spring, a gauge, a gasket, oil, lubricant, a tool, a wiring harness, a wire connector, a chain, a belt, and combinations thereof.

In this specification and in the claims, the term "corresponds to", as used in the phrase "each unique aircraft maintenance zone designation corresponds to a unique maintenance zone of the aircraft", means that the aircraft maintenance zone components associated with the unique aircraft maintenance zone designation are to be used to maintain the equipment in the unique aircraft maintenance zone of the aircraft associated with the respective unique aircraft maintenance zone designation. Preferably, at least one, and most preferably all, of the unique aircraft maintenance zone designations correspond(s) to its own unique aircraft maintenance zone. That is, there is a one-to-one correspondence of the unique aircraft maintenance zone designation to the unique aircraft maintenance zone. One-to-one correspondence is a well-known term and means that one object, in this case the unique aircraft maintenance zone designation, is matched to one other object, in this case the unique aircraft maintenance zone.

In a preferred embodiment, there are at least two packages. Such an embodiment will include at least a first package comprising a first unique aircraft maintenance zone designation and at least one first maintenance zone component; and at least a second package comprising a second unique aircraft maintenance zone designation and at least one second maintenance zone component. In such an embodiment, the first unique aircraft maintenance zone designation corresponds to a first unique maintenance zone of the aircraft while the second unique aircraft maintenance zone designation corresponds to a second unique maintenance zone of the aircraft.

In some embodiments, each package of the plurality of packages may contain more than one aircraft maintenance zone component. The number of aircraft maintenance zone components in each package may vary depending upon the number of maintenance zone components required or recommended to complete maintenance of the unique maintenance zone of the aircraft corresponding to each package.

In some embodiments, each component of the at least one aircraft maintenance zone component in each package may also comprise the unique aircraft maintenance zone designation. For instance, in an embodiment having two packages, each component of the at least one first maintenance zone component may comprise the first unique aircraft maintenance zone designation while each component of the at least one second maintenance zone component may comprise the second unique aircraft maintenance zone designation.

In some embodiments, each component of the at least one aircraft maintenance zone component in each package may be contained in a separate component package. For instance, in an embodiment having two packages, each component of the at least one first maintenance zone component may be contained in a separate first component package while each component of the at least one second maintenance zone component may be contained in a separate second component package. Where each component of the at least one aircraft component in each package is contained in a separate component package, it is preferred that each component package comprise the unique aircraft maintenance zone designation corresponding to the package containing the maintenance zone component. For instance, in an embodiment having two packages, each separate first component package may comprise the first unique aircraft maintenance zone designation while each separate second component package may comprise the second unique aircraft maintenance zone designation.

It should be noted that each maintenance zone component of each package comprising the unique maintenance zone designation corresponding to each package, and each component of each package being contained in a separate additional component package comprising the unique maintenance zone designation corresponding to each package are not mutually exclusive. In some embodiments, each maintenance zone component of each package may comprise the unique maintenance designation corresponding to each package and each component of each package may be contained in a separate additional component package comprising the unique maintenance zone designation corresponding to each package.

The number of packages may vary depending upon the number of unique maintenance zones of the aircraft. In one embodiment, the maintenance kit may comprise a plurality of additional packages and a plurality of additional unique maintenance zones of the aircraft. In such an embodiment, each of the plurality of additional packages may comprise an additional unique aircraft maintenance zone designation and at least one additional maintenance zone component. In such an embodiment each additional unique aircraft maintenance zone designation will correspond to one of the additional unique maintenance zones of the aircraft.

In some embodiments having a plurality of additional packages and a plurality of additional unique maintenance zones of the aircraft, each component of each of the plurality of additional packages may comprise the additional unique aircraft maintenance zone designation corresponding to one of the respective additional unique maintenance zones of the aircraft.

In some embodiments having a plurality of additional packages and a plurality of additional unique maintenance zones of the aircraft, each component of each of the plurality of additional packages may be contained in a separate additional component package. In such an embodiment, each additional component package may comprise the additional unique aircraft maintenance zone designation corresponding to one of the additional unique zones of the aircraft.

The number of additional packages within the plurality of additional packages may vary depending upon the number of additional unique maintenance zones of the aircraft. For instance, there may be two additional unique maintenance zones of the aircraft, in which case there may be two additional packages. In another embodiment there may be four additional unique maintenance zones of the aircraft, in which case there may be four additional packages. The number of unique maintenance zones of the aircraft may vary depending upon the type of aircraft. By way of example, but not limitation, there may be two, three, four, five, six, seven, eight, nine or ten unique maintenance zones of the aircraft.

The types of components contained in each package may also vary depending upon the type of aircraft. For instance, in the helicopter example disclosed above there may be five packages corresponding to the five unique helicopter maintenance zones. The first package, corresponding to the first unique helicopter maintenance zone, may contain one or more components selected from the group consisting of at least one seal, at least one washer, at least one bolt, at least one nut, at least one o-ring, at least one clip, at least one shim, at least one bushing, at least one retainer, at least one bearing, at least one scraper, at least one screw, at least one pin—e.g. a cotter pin, at least one roller, at least one grommet, at least one filter, at least one spring, at least one gauge, at least one gasket, at least one oil, at least one lubricant, at least one tool, at least one wiring harness, at least one wire connector, at least one chain, at least one belt, and combinations thereof. The second package, corresponding to the second unique helicopter maintenance zone, may contain one or more components selected from the group consisting of at least one seal, at least one washer, at least one bolt, at least one nut, at least one o-ring, at least one clip, at least one shim, at least one bushing, at least one retainer, at least one bearing, at least one scraper, at least one screw, at least one pin—e.g. a cotter pin, at least one roller, at least one grommet, at least one filter, at least one spring, at least one gauge, at least one gasket, at least one oil, at least one lubricant, at least one tool, at least one wiring harness, at least one wire connector, at least one chain, at least one belt, and combinations thereof. The third package, corresponding to the third unique helicopter maintenance zone, may contain one or more components selected from the group consisting of at least one seal, at least one washer, at least one bolt, at least one nut, at least one o-ring, at least one clip, at least one shim, at least one bushing, at least one retainer, at least one bearing, at least one scraper, at least one screw, at least one pin—e.g. a cotter pin, at least one roller, at least one grommet, at least one filter, at least one spring, at least one gauge, at least one gasket, at least one oil, at least one lubricant, at least one tool, at least one wiring harness, at least one wire connector, at least one chain, at least one belt, and combinations thereof. The fourth package, corresponding to the fourth unique helicopter maintenance zone, may contain one or more components selected from the group consisting of at least one seal, at least one washer, at least one bolt, at least one nut, at least one o-ring, at least one clip, at least one shim, at least one bushing, at least one retainer, at least one bearing, at least one scraper, at least one screw, at least one pin—e.g. a cotter pin, at least one roller, at least one grommet, at least one filter, at least one spring, at least one gauge, at least one gasket, at least one oil, at least one lubricant, at least one tool, at least one wiring harness, at least one wire connector, at least one chain, at least one belt, and combinations thereof. The fifth package, corresponding to the fifth unique helicopter maintenance zone, may contain one or more components selected from the group consisting of at least one seal, at least one washer, at least one bolt, at least one nut, at least one o-ring, at least one clip, at least one shim, at least one bushing, at least one retainer, at least one bearing, at least one scraper, at least one screw, at least one pin—e.g. a cotter pin, at least one roller, at least one grommet, at least one filter, at least one spring, at least one gauge, at least one gasket, at least one oil, at least one lubricant, at least one tool, at least one wiring harness, at least one wire connector, at least one chain, at least one belt, and combinations thereof. Again, the number of packages, number of components in each package, type of components, and number of each type of components in each package may vary depending upon the type of aircraft, the number of unique maintenance zones in the aircraft, and the number and type of parts required or recommended for completing maintenance in each unique maintenance zone of the aircraft.

In some embodiments, the aircraft kit may further comprise an aircraft schematic with the aircraft schematic preferably corresponding to the specific type (i.e. make and model) of aircraft for which the aircraft maintenance kit is designed. The aircraft schematic may comprise a plurality of aircraft schematic zones with each aircraft schematic zone preferably comprising a unique aircraft schematic zone designation. Each unique aircraft schematic zone designation preferably corresponds to one of the unique aircraft maintenance zone designations. In a preferred embodiment, at least one, preferably all, of the unique aircraft schematic zone designations correspond(s) to its own unique aircraft maintenance zone designations. That is, there is a one-to-one correspondence of the unique aircraft schematic zone designations to the unique maintenance zone designations. One to one correspondence is a well-known term and means that one object, in this example the unique aircraft schematic zone designation is matched to one other object, in this case the unique aircraft maintenance zone designation.

By way of example, but not limitation, the aircraft schematic may comprise at least a first aircraft schematic zone comprising a first unique aircraft schematic zone designation, and at least a second aircraft schematic zone comprising a second unique aircraft schematic zone designation. In such an example, the first unique aircraft schematic zone designation preferably corresponds to the first unique aircraft maintenance zone designation while the second unique aircraft schematic zone designation preferably correspond to the second unique aircraft maintenance zone designation.

The number of unique aircraft schematic zones should preferably correspond to the number of unique maintenance zones of the aircraft. In some embodiments, there may be a plurality of additional aircraft schematic zones with each of the plurality of additional aircraft schematic zones preferably comprising an additional unique aircraft schematic zone designation. In such an example, each additional aircraft schematic zone designation preferably corresponds to one of the additional unique aircraft maintenance zone designations.

In the helicopter example provided above, an aircraft schematic of which is shown in FIG. 1, the aircraft schematic might take the form of a piece of paper comprising a picture or outline of the helicopter. For example, the picture or outline of the helicopter can be broken up into the five unique helicopter maintenance zones with the picture or outline comprising a first aircraft schematic zone (10) corresponding to the first unique helicopter maintenance zone, a second aircraft schematic zone (20) corresponding to the second unique helicopter maintenance zone, a third aircraft schematic zone (30) corresponding to the third unique helicopter maintenance zone, a fourth aircraft schematic zone (40) corresponding to the fourth unique helicopter maintenance zone, and a fifth aircraft schematic zone (50) corresponding to the fifth unique helicopter maintenance zone.

Preferably the aircraft schematic zone designations should correspond to the aircraft maintenance zone designations. For instance, each of the aircraft schematic zone designations may be a separate aircraft schematic zone color (e.g. blue, green, purple, red, yellow, orange, white, black, grey and variations and combinations thereof corresponding to one of the separate aircraft maintenance zone designation colors. In another example, each of the aircraft schematic zone designations may be a separate aircraft schematic zone letter (e.g. A, B, C, D, E, and so on) corresponding to one of the separate aircraft maintenance zone designation letters. In still another example, each of the aircraft schematic zone designations may be a separate aircraft schematic zone number (e.g. 1, 2, 3, 4, 5, and so on) corresponding to one of the separate aircraft maintenance zone designation numbers. In yet another example, each of the aircraft schematic zone designations may be a separate aircraft schematic zone symbol corresponding to one of the separate aircraft maintenance zone designation symbols. As used in this specification and in the claims, an "aircraft schematic zone designation symbol" is meant to refer to any marking other than colors, letters, numbers, words or combinations of words. By way of example, but not limitation, an "aircraft schematic zone designation symbol" may be in the form of Greek letters or Roman numerals. In still another example, each of the aircraft schematic zone designations may be a separate aircraft schematic zone word or series of separate aircraft schematic zone words corresponding to one of the separate aircraft maintenance zone designation words or series of aircraft maintenance zone designation words.

As with the different types of aircraft maintenance zone designations, the different types of aircraft schematic zone designations are not mutually exclusive and can be combined. By way of example, but not limitation, each of the aircraft schematic zone designations may comprise a separate aircraft schematic zone designation color and a separate aircraft schematic zone designation letter. In a separate, non-limiting, example, each of the aircraft schematic zone designations may comprise a separate aircraft schematic zone designation symbol and a separate aircraft schematic zone designation word.

Where the aircraft schematic zone designations comprise more than one type of aircraft schematic zone designation, it is not necessary for the aircraft schematic to contain all of the same types of designations as the aircraft maintenance zone designations. For instance, the aircraft schematic may contain aircraft schematic zone designation colors with each aircraft schematic zone designation color corresponding to one of the separate aircraft maintenance zone designation colors, while the aircraft schematic also contains aircraft schematic zone designation words. In such an embodiment, the aircraft schematic zone designation words may assist the maintenance personnel in identifying the particular aircraft maintenance zones, but it may not be necessary to include aircraft maintenance zone designation words corresponding to the aircraft schematic zone words on the individual packages, components or component packages.

What is claimed is:

1. A maintenance kit for an aircraft, said aircraft comprised of aircraft components, said maintenance kit comprising:
   at least a first physical package of the maintenance kit for an aircraft comprising a first unique aircraft maintenance zone designation and containing a plurality of first maintenance zone components capable of replacing at least some of the aircraft components in a first unique maintenance zone of the aircraft, and
   at least a second physical package of the maintenance kit for an aircraft comprising a second unique aircraft maintenance zone designation and containing a plurality of second maintenance zone components capable of replacing at least some of the aircraft components in a second unique maintenance zone of the aircraft;
   a plurality of first maintenance zone component packages containing the first maintenance zone components;
   a plurality of second maintenance zone component packages containing the second maintenance zone components;
   wherein
   the first unique aircraft maintenance zone designation corresponds to the first unique maintenance zone of the aircraft;
   the second unique aircraft maintenance zone designation corresponds to the second unique maintenance zone of the aircraft;
   the first maintenance zone component packages bear the first unique aircraft maintenance zone designation; and
   the second maintenance zone component packages bear the second unique aircraft maintenance zone designation.

2. The aircraft maintenance kit of claim 1, wherein at least one of the aircraft maintenance zone designations is a separate aircraft maintenance zone designation color.

3. The aircraft maintenance kit of claim 1, wherein at least one of the aircraft maintenance zone designations is a separate aircraft maintenance zone designation letter.

4. The aircraft maintenance kit of claim 1, wherein at least one of the aircraft maintenance zone designations is a separate aircraft maintenance zone designation number.

5. The aircraft maintenance kit of claim 1, wherein each of the aircraft maintenance zone designations is a separate aircraft maintenance zone designation symbol.

6. The aircraft maintenance kit of claim 1, wherein each of the aircraft maintenance zone designations is a separate aircraft maintenance zone designation word or series of separate aircraft maintenance zone designation words.

7. The aircraft maintenance kit of claim 1, further comprising an aircraft schematic comprising,
   at least a first aircraft schematic zone comprising a first unique aircraft schematic zone designation, and
   at least a second aircraft schematic zone comprising a second unique aircraft schematic zone designation;
   wherein
   the first unique aircraft schematic zone designation corresponds to the first unique aircraft maintenance zone designation, and
   the second unique aircraft schematic zone designation corresponds to the second unique aircraft maintenance zone designation.

8. The maintenance kit of claim 7, further comprising a plurality of additional physical packages of the maintenance kit for an aircraft and a plurality of additional unique maintenance zones of the aircraft wherein each of the plurality of additional physical packages comprises an additional unique aircraft maintenance zone designation and a plurality of additional maintenance zone components capable of replacing at least some of the aircraft components in one of the additional unique maintenance zones of the aircraft, wherein each additional unique aircraft maintenance zone designation corresponds to one of the additional unique maintenance zones of the aircraft.

9. The maintenance kit of claim 8, wherein the aircraft schematic further comprises a plurality of additional aircraft schematic zones, each of the plurality of additional aircraft schematic zones comprising an additional unique aircraft schematic zone designation, wherein each additional aircraft schematic zone designation corresponds to one of the additional unique aircraft maintenance zone designations.

10. The aircraft maintenance kit of claim 7, wherein at least one of the aircraft maintenance zone designations is a separate aircraft maintenance zone designation color.

11. The maintenance kit of claim 10, wherein each of the aircraft schematic zone designations is a separate aircraft schematic zone color corresponding to one of the separate aircraft maintenance zone designation colors.

12. The aircraft maintenance kit of claim 7, wherein at least one of the aircraft maintenance zone designations is a separate aircraft maintenance zone designation letter.

13. The maintenance kit of claim 12, wherein each of the aircraft schematic zone designations is a separate aircraft schematic zone letter corresponding to one of the separate aircraft maintenance zone designation letters.

14. The aircraft maintenance kit of claim 7, wherein at least one of the aircraft maintenance zone designations is a separate aircraft maintenance zone designation number.

15. The maintenance kit of claim 14, wherein each of the aircraft schematic zone designations is a separate aircraft schematic zone number corresponding to one of the separate aircraft maintenance zone designation numbers.

16. The aircraft maintenance kit of claim 7, herein each of the aircraft maintenance zone designations is a separate aircraft maintenance zone designation symbol.

17. The maintenance kit of claim 16, wherein each of the aircraft schematic zone designations is a separate aircraft schematic zone symbol corresponding to one of the separate aircraft maintenance zone designation symbols.

18. The aircraft maintenance kit of claim 7, wherein each of the aircraft maintenance zone designations is a separate aircraft maintenance zone designation word or series of separate aircraft maintenance zone designation words.

19. The maintenance kit of claim 18, wherein each of the aircraft schematic zone designations is a separate aircraft schematic zone word or series of separate aircraft schematic zone words corresponding to one of the separate aircraft maintenance zone designation words or series of aircraft maintenance zone designation words.

* * * * *